(12) United States Patent
Buccella et al.

(10) Patent No.: US 8,271,501 B2
(45) Date of Patent: Sep. 18, 2012

(54) WEB SEARCH AMONG RICH MEDIA OBJECTS

(75) Inventors: Christopher J. Buccella, Poughkeepsie, NY (US); Sean L. Dague, Poughkeepsie, NY (US); Kurt R. Taylor, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 12/336,939

(22) Filed: Dec. 17, 2008

(65) Prior Publication Data
US 2010/0153354 A1    Jun. 17, 2010

(51) Int. Cl.
*G06F 17/30* (2006.01)
(52) U.S. Cl. .......... 707/748; 707/722; 707/752
(58) Field of Classification Search .......... 707/706, 707/709, 722, 732, 736, 748, 780, 661, 688, 707/999.003–999.005, 752; 705/1.1
See application file for complete search history.

(56) References Cited

U.S. PATENT DOCUMENTS

| | | | |
|---|---|---|---|
| 7,603,350 B1 * | 10/2009 | Guha | 1/1 |
| 7,805,431 B2 * | 9/2010 | Siegel | 707/708 |
| 8,150,843 B2 * | 4/2012 | Chitiveli et al. | 707/723 |
| 2005/0256866 A1 * | 11/2005 | Lu et al. | 707/5 |
| 2006/0271524 A1 * | 11/2006 | Tanne et al. | 707/3 |
| 2006/0282465 A1 * | 12/2006 | Sharma | 707/104.1 |
| 2006/0294085 A1 * | 12/2006 | Rose et al. | 707/3 |
| 2007/0011155 A1 * | 1/2007 | Sarkar | 707/5 |
| 2007/0043583 A1 * | 2/2007 | Davulcu et al. | 705/1 |
| 2007/0078832 A1 * | 4/2007 | Ott et al. | 707/3 |
| 2007/0078884 A1 * | 4/2007 | Ott et al. | 707/102 |
| 2007/0174247 A1 * | 7/2007 | Xu et al. | 707/3 |
| 2007/0185858 A1 * | 8/2007 | Lu et al. | 707/5 |
| 2008/0005064 A1 * | 1/2008 | Sarukkai | 707/3 |
| 2008/0059458 A1 | 3/2008 | Byron | |
| 2008/0082607 A1 * | 4/2008 | Sastry et al. | 709/204 |
| 2008/0194175 A1 * | 8/2008 | Last et al. | 446/302 |
| 2009/0006434 A1 * | 1/2009 | Fowler et al. | 707/101 |
| 2009/0144272 A1 * | 6/2009 | Adarsh et al. | 707/5 |
| 2009/0157667 A1 * | 6/2009 | Brougher et al. | 707/5 |
| 2010/0082653 A1 * | 4/2010 | Nair | 707/759 |
| 2010/0153404 A1 * | 6/2010 | Ghosh et al. | 707/748 |

* cited by examiner

*Primary Examiner* — Dennis Truong
(74) *Attorney, Agent, or Firm* — Kunzler Needham Massey & Thorpe

(57) ABSTRACT

Web search by a search engine among rich media objects, the search engine including a web crawler, where web search includes: maintaining, for each of a plurality of users, a reputation score; counting, by the web crawler for a particular search term, a number of tags associated with one or more rich media objects by one or more of the users, the tags including text describing the rich media objects, the text including the particular search term; calculating, for the particular search term and for each of the one or more rich media objects, in dependence upon the number of tags associated with the rich media objects and the reputation scores of the users that associated the tags with the rich media objects, a search result score; and recording the search result scores of each of the one or more rich media objects in a primary search index.

18 Claims, 5 Drawing Sheets

WEB SEARCH AMONG RICH MEDIA OBJECTS

BACKGROUND OF THE INVENTION

1. Field of the Invention

The field of the invention is data processing, or, more specifically, methods, apparatus, and products for web search among rich media objects.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Web search is one area of computer technology that has experienced advances. The amount of information accessible through the Internet and within particular environments is continually increasing. Search engines have been employed to aid users in searching through that information for particular instances of information. Current search engine technology, however, is unable to search and return accurate results of one particular category of information available on the Internet, web environments, and other network based environments called rich media which includes image files, video files, 3D representation files, and so on.

SUMMARY OF THE INVENTION

Methods, apparatus, and products for web search by a search engine among rich media objects, the search engine including a web crawler, where web search includes: maintaining, by the search engine for each of a plurality of users, a reputation score; counting, by the web crawler for a particular search term, a number of tags associated with one or more rich media objects by one or more of the users, the tags including text describing the one or more rich media objects, the text including the particular search term; calculating, by the search engine, for the particular search term and for each of the one or more rich media objects, in dependence upon the number of tags associated with the one or more rich media objects and the reputation scores of the users that associated the tags with the rich media objects, a search result score; and recording, by the search engine, the search result scores of each of the one or more rich media objects in a primary search index.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
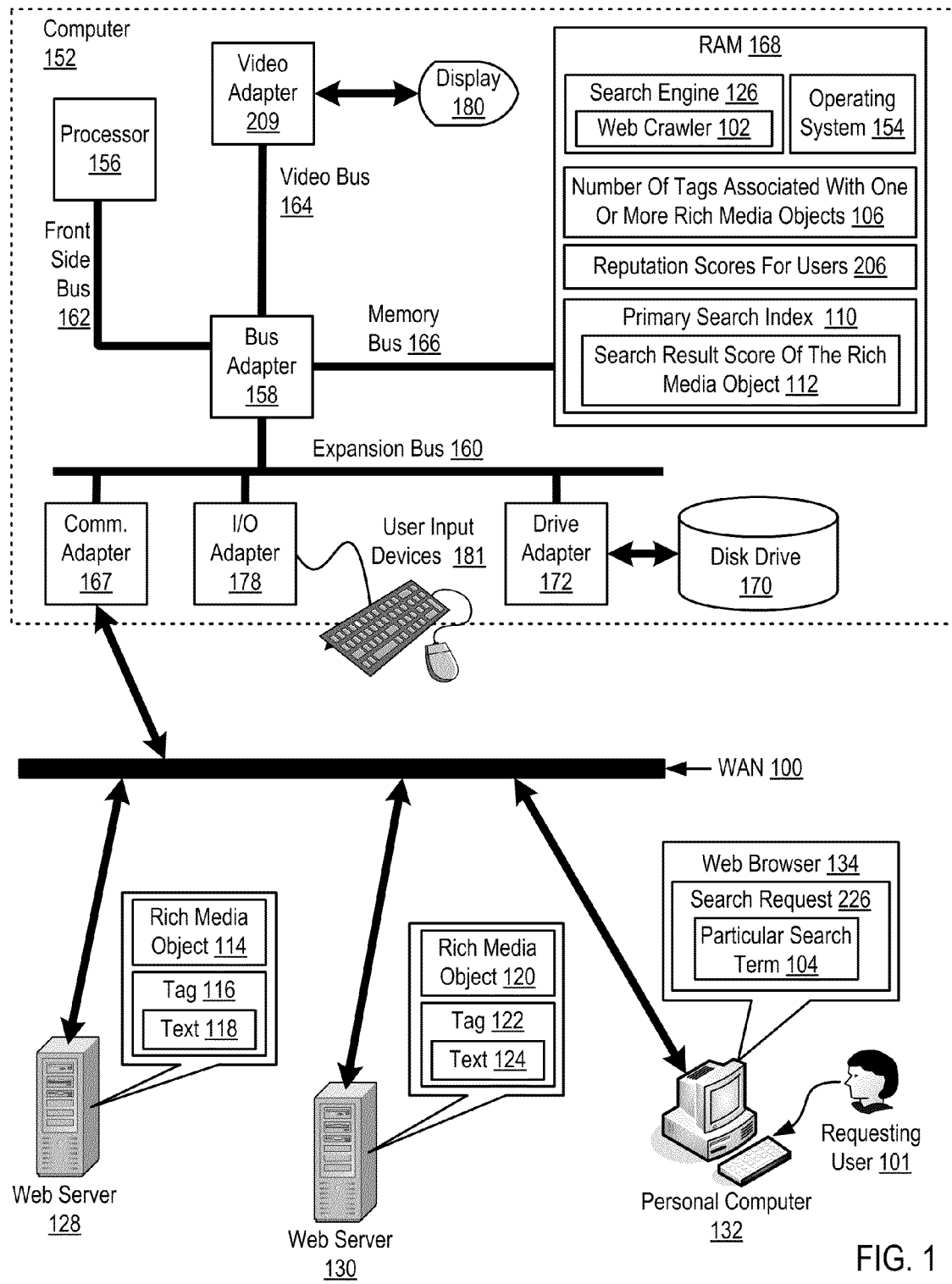
FIG. 1 sets forth a network diagram of an exemplary system for web search among rich media objects according to embodiments of the present invention.

Exemplary methods, apparatus, and products for web search among rich media objects in accordance with the present invention are described with reference to the accompanying drawings, beginning with FIG. 1. FIG. 1 sets forth a network diagram of an exemplary system for web search among rich media objects according to embodiments of the present invention. The system of FIG. 1 includes a computer (152) which in turn includes at least one computer processor (156) or 'CPU' as well as random access memory (168) ('RAM') which is connected through a high speed memory bus (166) and bus adapter (158) to processor (156) and to other components of the computer (152).

The example computer (152) of FIG. 1 is connected for data communications through a Wide Area Network ('WAN') (100) to a number of web servers (128, 130), each server hosting one or more rich media object (114, 120). A web server (120, 122, 124) as the term is used here refers to the computer hardware and computer software configured to host web pages and accept HyperText Transfer Protocol ('HTTP') requests from web clients, known as web browsers, and serve the browsers HTTP responses along with optional data content, which may include HTML documents, web page elements, rich media objects, metadata describing the rich media objects, and the like. A rich media object is any element, other than text, generally accessible over a data communications network by a computer. Examples of such rich media objects include images, 3-dimensional ('3D') objects, video files, webpage-embedded Flash™ content, and so on as will occur to readers of skill in the art.

Each of the rich media objects (114, 120) hosted by the web servers (128, 130) in the example system of FIG. 1 is associated with one or more tags (116, 122). A tag is metadata associated with a rich media object by a user, the metadata including text (118, 124) describing the rich media object (114, 120) with which the tag is associated. The process of associating such a tag to a rich media object is sometimes referred to as 'tagging' a rich media object. Such tags may enable a more detailed description of a rich media object than that which is available by the filename or Uniform Resource Locator ('URL') of the rich media object. A 3D representation of an elephant, for example, may have a filename of elephant-.dwg, while one or more tags of the file may include text describing the 3D representation as 'elephant,' 'pink,' 'big ears,' Dumbo, 'flying elephant,' and so on, providing a more detailed explanation of the 3D representation of the elephant.

Stored in RAM (168) of the computer (152) is a search engine (126), a module of computer program instructions that operates generally for web search among rich media objects according to embodiments of the present invention. The term 'web search' as used in this specification refers to providing to a user search services across network-connected environments generally. While one common network-connected environment is the Internet, web search according to embodiments of the present invention is not limited to only the Internet. Search engines according to embodiments of the present invention may be implemented in various forms. Search engines according to embodiments of the present invention may be useful in any network-enabled environment having user-generated content, such as the Internet generally, a more localized web environment, or another network-enabled environment. A search engine configured according to embodiments of the present invention may be implemented, for example, as a component of a web page presented to browsing users on the Internet, where the search engine is configured for broadly searching across the Internet.

A search engine configured according to embodiments of the present invention may also be implemented, as another example, as an embedded component of one web environment, such as a social-multimedia hosting website, where the search engine is limited to searching only within the one web environment, not broadly searching across the Internet as such. A web environment as the term is used here refers to a defined collection of one or more hosted web pages. In some embodiments, a web environment is defined by a top level domain, such as www.ibm.com. All web pages under the top level domain www.ibm.com form the www.ibm.com web environment. A search engine improved for web search among rich media objects according to embodiments of the present invention implemented as a component of the www.ibm.com web environment may be configured to search only web pages falling under the top level domain www.ibm.com. Another example of a web environment is the www-.flickr.com website, an image hosting website and service that enables users to upload digital image files, photographs, among other multi-media files, to a web server for storage and hosting. The collection of a web pages making up the Flickr™ web hosting service define a web environment. A search engine improved for web search among rich media objects according to embodiments of the present invention implemented within the Flickr web environment may be configured to search only within the Flickr collection of web pages. Readers of skill in the art will recognize that these are but two example implementations, among many possible implementations, of search engines configured for web search among rich media objects according to embodiments of the present invention.

A search engine configured according to embodiments of the present invention may also be implemented, as another example, as a component of another type of network-enabled environment, such as a network gaming environment or a virtual world. An example type of network gaming environment includes massively multiplayer online role-playing games ('MMORPGs') such as Billizard's World of Warcraft. Examples of virtual worlds include Second Life, Entropia Universe, and the like.

Web search among rich media objects (114, 120) according to embodiments of the present invention may include maintaining, by the search engine (102) for each of a number of users, a reputation score (206). A reputation score is a numerical value that quantifies a user's tagging activities. In some embodiments a user's reputation score may be decreased upon expiration of a period of time during which the user tagged no objects, increased for subsequent matching tags of a particular object by other users, decreased when maliciously tagging a rich media object with an known inaccurate description of the object, or otherwise altered as will occur to readers of skill in the art.

The search engine (126) in the example of FIG. 1 also includes a web crawler (102), a software component of the search engine that operates generally by so-called 'crawling' web servers, file systems, and the like, identifying possible search results in dependence upon predetermined criteria, in order to generate one or more search indexes. The web crawler (102) in the example of FIG. 1 operates specifically for web search among rich media objects (114, 120) according to embodiments of the present invention by counting, for a particular search term (104), a number (106) of tags (116, 122) associated with rich media objects (114, 120) by one or more users. The tags (116, 122) in the example of FIG. 1 include text (118, 124) describing the rich media objects (114, 120) and the text, in turn, includes the particular search term (104).

Web search among rich media objects (114, 120) according to embodiments of the present invention may also includes calculating, for the particular search term (104) and for each of the one or more rich media objects (114, 120), by the search engine (126), in dependence upon the number of tags associated with the one or more rich media objects and the reputation scores of the users that associated the tags with the rich media objects (114, 120), a search result score (112). A search result score (112) is a value associated with a rich media object that is used to rank rich media objects as search results.

Web search among rich media objects (114, 120) according to embodiments of the present invention may also include recording, by the search engine (126), the search result scores (112) of each of the one or more rich media objects (114, 120) in a primary search index (110). A primary search index (110) is a data structure or collection of data structures—such as, for example, tables, lists, databases, files, and so on as will occur to readers of skill in the art—that stores records representing search results scores of rich media objects with respect to search terms. The primary search index (110) is used by the search engine to generate, rank, and return search results in response to a search request (226) from a requesting user (101). In the system of FIG. 1, for example, the search engine (126) may receive, from a requesting user (101), a search request (226) that includes the particular search term (104). The requesting user (101) may provide the search engine (126) with such a request (226) through a web browser (134) executing on a personal computer (132) and the WAN (100). The search engine, responsive to the search request (226) may return, to the requesting user (101) in dependence upon the primary search index (110), search results (112) that include rich media objects (114, 120) and are ranked in order of calculated search result scores (112).

Also stored in RAM (168) is an operating system (154). Operating systems useful for web search among rich media objects according to embodiments of the present invention include UNIX™, Linux™, Microsoft XP™, AIX™, IBM's i5/OS™, and others as will occur to those of skill in the art. The operating system (154), search engine (126), search index (110), and reputation scores (206), number of tags (106), in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for web search among rich media objects according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (132), web servers (128, 130), and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for web search among rich media objects according to embodiments of the present invention include modems for wired dial-up communications, Ethernet (IEEE 802.3) adapters for wired data communications network communications, and 802.11 adapters for wireless data communications network communications.

The arrangement of web servers (128, 130), networks (100), computers (132, 152), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
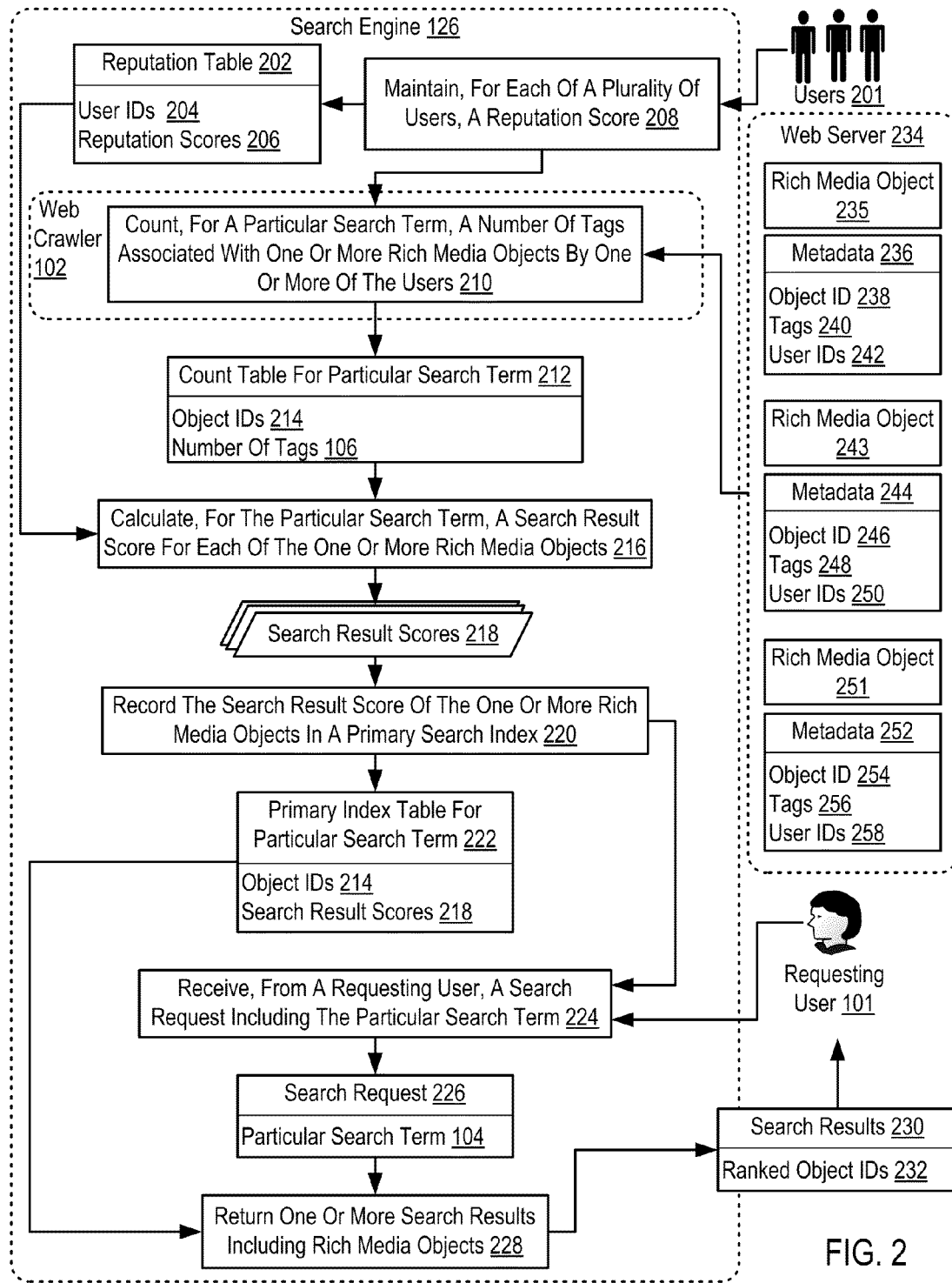
FIG. 2 sets forth a flow chart illustrating an exemplary method for web search among rich media objects according to embodiments of the present invention.

For further explanation, FIG. 2 sets forth a flow chart illustrating an exemplary method for web search among rich media objects according to embodiments of the present invention. As mentioned above methods of web search among rich media objects according to embodiments of the present of the invention are carried out by a search engine which includes, as a software component, a web crawler.

The method of FIG. 2 includes maintaining (208), by the search engine (126) for each of a number of users (201), a reputation score (206). Maintaining (208), by the search engine (126) for each of a number of users (201), a reputation score (206) may include recording in one or more data structures, such as the example reputation table (202) of FIG. 2 or a user profile, reputation scores (206) in association with user identifications ('ID') (204) of users (201). A user identification is any value that uniquely or semi-uniquely identifies a user such as for example, and Internet Protocol ('IP') address of the user's computer, a Media Access Control ('MAC') address of the network interface card of the user's computer, a login name selected by the user, and others as may occur to readers of skill in the art.

The method of FIG. 2 also includes counting (210), by the web crawler (102) for a particular search term (104), a number (106) of tags (240,248,256) associated with one or more rich media objects (235, 243, 252) by one or more of the users (201). The tags (240,248,256) include text describing the one or more rich media objects (235, 243, 252). The text of the tags includes the particular search term (104). Counting (210), by the web crawler (102) for a particular search term (104), a number (106) of tags (240,248,256) associated with one or more rich media objects (235, 243, 252) by one or more of the users (201) may be carried out by searching metadata (236, 244, 252) of the rich media objects (235, 243, 251) hosted on a web server (234) for tags that include text matching the particular search term, incrementing a count for each tag that includes such matching text, and associating in a data structure, such as the example table (212) of FIG. 2, the count with an object identification ('ID') (214). An object ID as the term is used in this specification is any value that uniquely or semi-uniquely identifies a rich media object. Examples of such identifications include a Uniform Resource Locator ('URL') of a rich media object, a filename of the rich media object, a user assigned identification of a rich media object designated as an object ID, a search engine assigned identification representing a rich media object within the search engine's operating environment, and so on as will occur to readers of skill in the art. In the example of FIG. 2, each rich media object (235, 243, 251) is associated with an object ID (238, 246, 254) stored in metadata (236) of the rich media object. Readers of skill in the art will recognize however that depending upon the implementation of the object ID, the object ID of a rich media object may be stored elsewhere, not on the web server at all, for example, but within a database managed only by the search engine (126).

The method of FIG. 2 also includes calculating (216), by the search engine (126), for the particular search term (104) and for each of the rich media objects (235, 243, 251), in dependence upon the number (106) of tags (240, 248, 256) associated with the rich media objects (235, 243, 251) and the reputation scores (206) of the users (201) that associated the tags (240, 248, 256) with the rich media objects (235, 243, 251), a search result score (218). Calculating (216) a search result score (218) in dependence upon the number (106) of tags (240, 248, 256) associated with the rich media objects (235, 243, 251) and the reputation scores (206) of the users (201) that associated the tags (240, 248, 256) with the rich media objects (235, 243, 251) may be carried out in various ways including, for example, summing, for each rich media object, the sum of reputation scores of tagging users and the number of tags for the rich media object, or summing a weighted average of the sum of reputation scores of tagging users and the number of tags for the rich media object, or in other ways as will occur to readers of skill in the art. A 'tagging user' of a rich media object as the term is used in this specification is a user that has associated tag with the rich media object.

The method of FIG. 2 also includes recording (220), by the search engine (126), the search result scores (218) of each of the rich media objects (235, 243, 251) in a primary search index. Recording (220), the search result scores (218) of each of the rich media objects (235, 243, 251) in a primary search index may be carried out by associating in a data structure, such as the example primary index table (222) for the particular search term (104) of FIG. 2, result scores (218) with object identifications (214). A primary search index may include any number of data structures including for examples, tables, files, databases, lists, linked lists, arrays, and so on. In some embodiments of the present invention, for example, the primary search index is a collection of tables, records, and fields forming a searchable database.

The method of FIG. 2 also includes receiving (224), by the search engine (126) from a requesting user (101), a search request (226) including the particular search term (104). Receiving (224) a search request (226) may be carried out in various ways including, for example, receiving a data communications message transmitted across a data communications network, such as the example WAN (100) of FIG. 1, from a user operating a web browser on a computer.

The method of FIG. 2 also includes returning (228), by the search engine (126) to the requesting user (101) in dependence upon the primary search index, one or more search results (230) including rich media objects (235, 243, 251) where the search results (230) are ranked (232) in order of calculated search result scores (214) of the rich media objects. Returning (228) one or more search results (230), where the search results (230) are ranked in order of calculated search result scores (214), may be carried out in various ways as including, for example, by querying the primary search index for records that include the particular search term and a search result score greater than a predetermined threshold, sorting the results of the query in descending order of the search result scores, and sending the sorted results to the requesting user (101) in a data communications message having in the message ranked object IDs (232), that is, object IDs of rich media objects sorted in descending order of search result scores.

Figure 3:
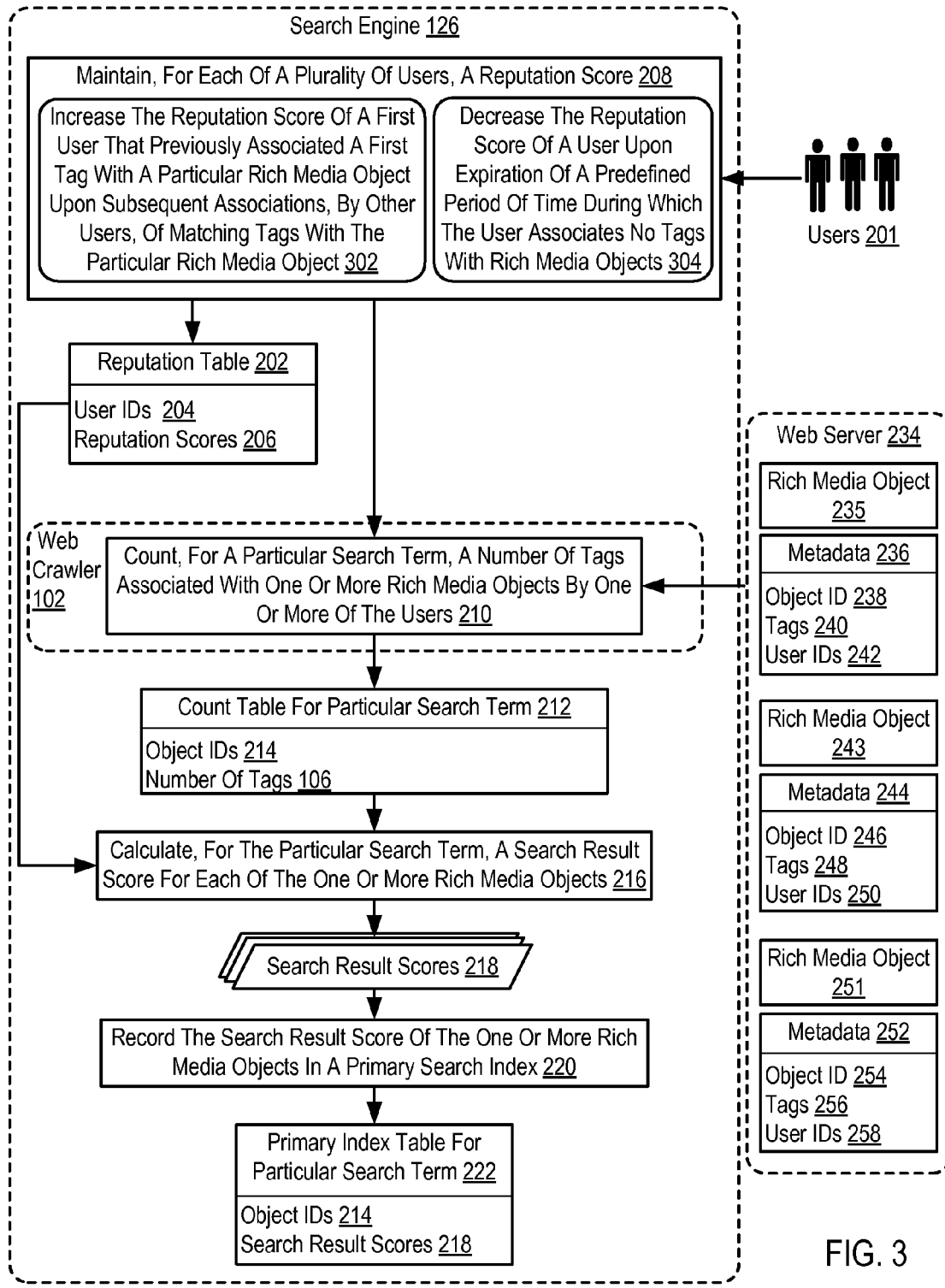
FIG. 3 sets forth a flow chart illustrating a further exemplary method for web search among rich media objects according to embodiments of the present invention in which maintaining a reputation score includes increasing the score upon subsequent matching tags and decreasing the score upon expiration of a predefined period of time during which a user is inactive.

For further explanation, FIG. 3 sets forth a flow chart illustrating a further exemplary method for web search among rich media objects according to embodiments of the present invention. The method of FIG. 3 is similar to the method of FIG. 2 in that the method of FIG. 3 also is carried out by a search engine (126) that includes as a software component, a web crawler (102). The method of FIG. 3 is also similar to the method of FIG. 2 in that the method of FIG. 3 includes maintaining (208), for each of a number of users (201), a reputation score (206); counting (210), by for a particular search term (104), a number (106) of tags associated with one or more rich media objects (235, 243, 251) by the users (201); calculating (216) a search result score (218) for the particular search term (104) and for each of the rich media objects (235, 243, 251); and recording (220) the search result scores (218) of each of the rich media objects (235, 243, 251) in a primary search index (222).

The method of FIG. 3 differs from the method of FIG. 2 however in that, in the method of FIG. 3, maintaining (208), for each of a number of users (201), a reputation score (206) includes increasing (302) the reputation score (206) of a first user that previously associated a first tag with a particular rich media object upon subsequent associations, by other users, of matching tags with the particular rich media object. 'Matching' as the term is used here may include an exact match, or a near match, such as "elephant" and "elephants." Furthermore, matching tags as used here may include many non-matching words and as little as one word that match. Consider as an example of matching tags having non-matching words the following tags: "blue elephant with big ears" and "pink elephant." Although the two tags have only one word in common, in some embodiments of the present invention the search engine may identify the tags as matching tags.

Increasing (302) the reputation score (206) of a first tagging user upon subsequent associations of matching tags with the same rich media object may be carried out by determining, upon each tag by any user, whether the tagged object is associated with a matching tag, if the tagged object is associated with a matching tag, identifying the previous tagging user, and incrementing the tagging user's reputation score. Matching tags of a rich media object may represent a general consensus by users of a description of the rich media object. Such a general consensus may provide more accurate search results to requesting users. As such, a user is 'rewarded' with an increased reputation score when other users subsequently tag an object with a matching tag. Such a reward encourages accurate descriptions of rich media objects by tagging users, thereby increasing the accuracy of search results by requesting users. Consider as an example that a first user tags a rich media object with text including the term "elephant." Upon each subsequent tag of the same rich media object that includes the term "elephant," the reputation score of the first user is incremented.

Also in the method of FIG. 3, maintaining (208), for each of a number of users (201), a reputation score (206) includes decreasing (304) the reputation score (206) of a user (201) upon expiration of a predefined period of time during which the user associates no tags with rich media objects. Decreasing (304) the reputation score (206) of a user (201) upon expiration of a predefined period of time during which the user associates no tags with rich media objects may be carried out in various ways including, periodically, upon expiration of the predefined period of time, determining the number of tags associated with objects by each user during the predefined period of time, and if the number of tags associated with objects by a user during the predefined period of time is zero, reducing the reputation score of the user.

Figure 4:
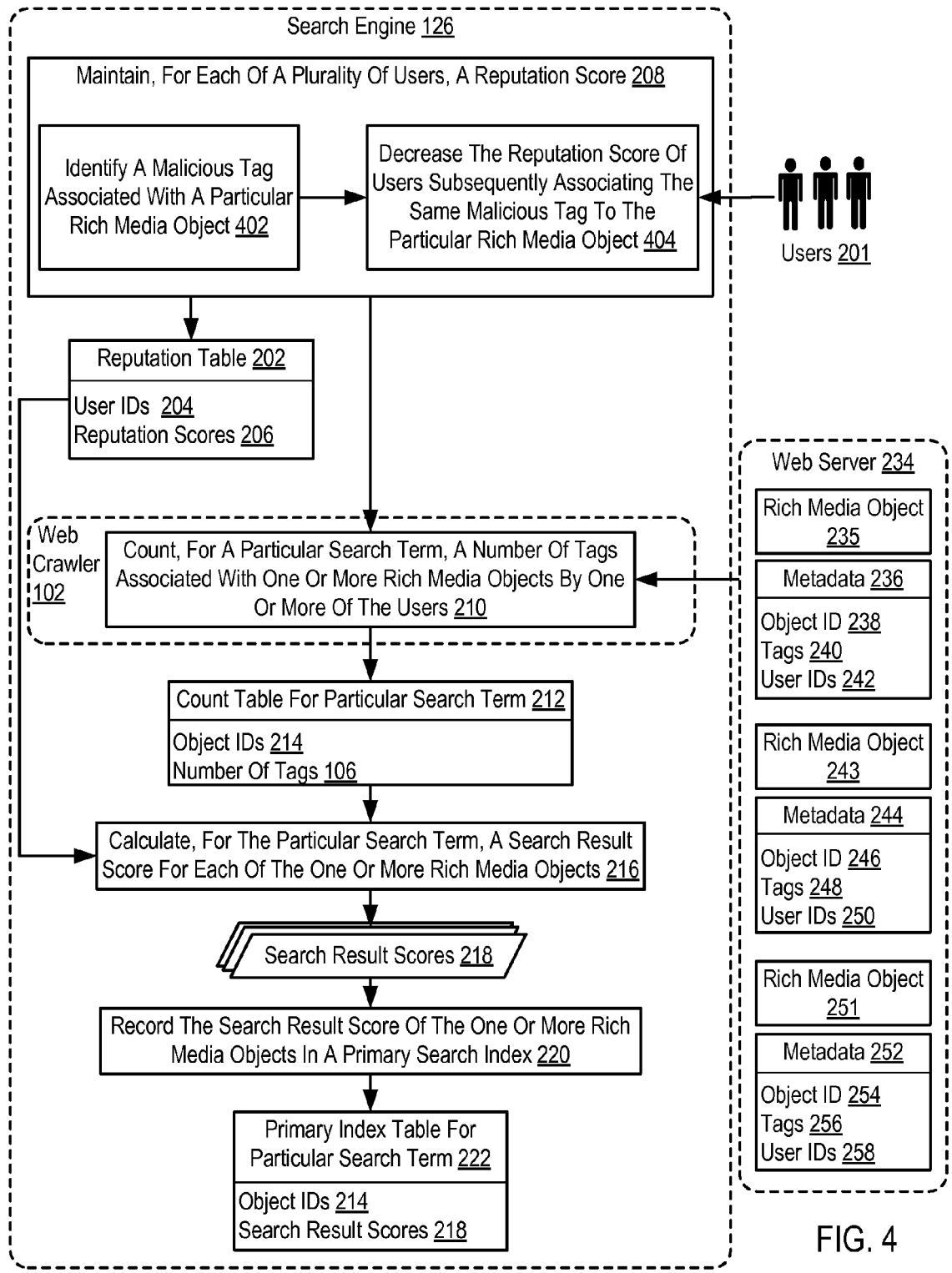
FIG. 4 sets forth a flow chart illustrating a further exemplary method for web search among rich media objects according to embodiments of the present invention in which maintaining a reputation score includes identifying a malicious tag associated with a particular rich media object, and decreasing the reputation score of users subsequently associating the same malicious tag to the particular rich media object.

For further explanation, FIG. 4 sets forth a flow chart illustrating a further exemplary method for web search among rich media objects according to embodiments of the present invention. The method of FIG. 4 is similar to the method of FIG. 2 in that the method of FIG. 4 also is carried out by a search engine (126) that includes as a software component, a web crawler (102). The method of FIG. 4 is also similar to the method of FIG. 2 in that the method of FIG. 4 includes maintaining (208), for each of a number of users (201), a reputation score (206); counting (210), by for a particular search term (104), a number (106) of tags associated with one or more rich media objects (235, 243, 251) by the users (201); calculating (216) a search result score (218) for the particular search term (104) and for each of the rich media objects (235, 243, 251); and recording (220) the search result scores (218) of each of the rich media objects (235, 243, 251) in a primary search index (222).

The method of FIG. 4 differs from the method of FIG. 2, however, in that in the method of FIG. 4, maintaining (208), for each of a number of users (201), a reputation score (206) includes identifying (402) a malicious tag associated with a particular rich media object (235, 243, 251) and decreasing (404) the reputation score of users (201) subsequently associating the same malicious tag to the particular rich media object (235, 243, 251). A malicious tag as the term is used here is a tag that includes, in text form, an inaccurate description of a particular rich media object intended to provide inaccurate search results for search requests having, as a search term, text included in the malicious tag. Consider as an example of a malicious tag, a tag associated with an animated video file of a pink elephant where the malicious tag includes as a description of the video the text "hippo." Such a tag inaccurately describes the video which includes and elephant not a hippopotamus, and may provide inaccurate search results, specifically the animated video of the pink elephant, when a search request includes the term "hippo."

Identifying (402) a malicious tag may be carried out in various ways including, for example, receiving a specification of one or more malicious tags from a system administrator, identifying for a search term, commonly unselected, highly ranked search results, or other ways as may occur to readers of skill in the art.

Decreasing (404) the reputation score of users (201) subsequently associating the same malicious tag to the particular rich media object (235, 243, 251) may be carried out by determining, upon a user tagging an rich media object, whether the tag matches a previously identified malicious tag of the same object, and if the tag matches the previously identified malicious tag of the same object, decrementing the value of the most recent tagging user's reputation score in a reputation table (202) or other data structure storing user identifications (204) in association with reputation scores (206).

Figure 5:
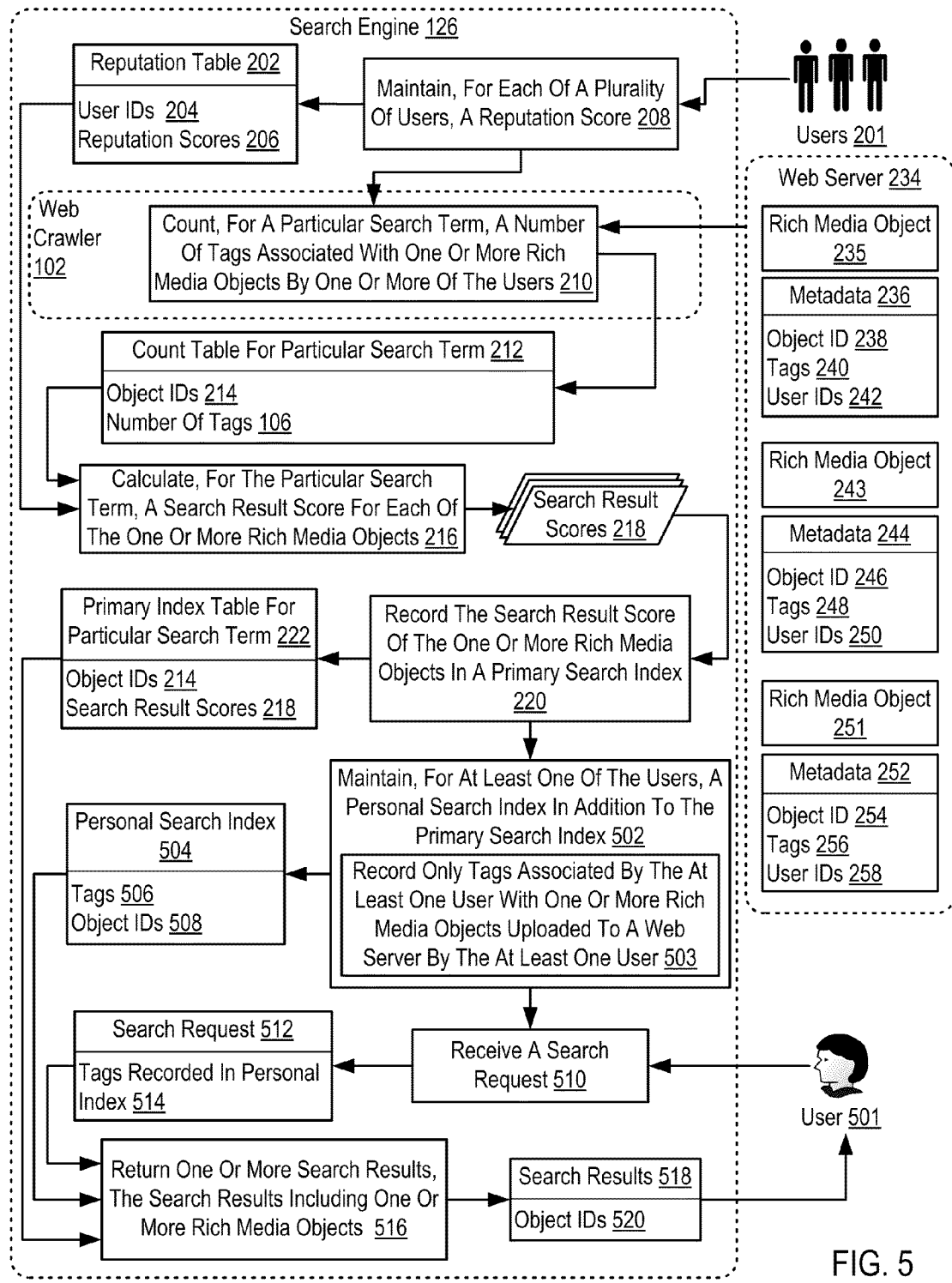
FIG. 5 sets forth a flow chart illustrating a further exemplary method for web search among rich media objects according to embodiments of the present invention in which the search engine maintains, in addition to the primary search index, a personal search index for each user.

For further explanation, FIG. 5 sets forth a flow chart illustrating a further exemplary method for web search among rich media objects according to embodiments of the present invention. The method of FIG. 5 is similar to the method of FIG. 2 in that the method of FIG. 5 also is carried out by a search engine (126) that includes as a software component, a web crawler (102). The method of FIG. 5 is also similar to the method of FIG. 2 in that the method of FIG. 5 includes maintaining (208), for each of a number of users (201), a reputation score (206); counting (210), by for a particular search term (104), a number (106) of tags associated with one or more rich media objects (235, 243, 251) by the users (201); calculating (216) a search result score (218) for the particular search term (104) and for each of the rich media objects (235, 243, 251); and recording (220) the search result scores (218) of each of the rich media objects (235, 243, 251) in a primary search index (222).

The method of FIG. 5 differs from the method of FIG. 2, however, in that the method of FIG. 5 includes maintaining (502), by the search engine (126) for at least one of the users (201), a personal search index (504) in addition to the primary search index (222). In the method of FIG. 5, maintaining (502), by the search engine (126) for at least one of the users (501), a personal search index (504) in addition to the primary search index (222) includes recording (502) in the personal search index (504) only tags associated by the user (501) with rich media objects uploaded to a web server (234) by the user (501). A personal search index may be implemented as any type of a data structure such as, for example, a table that includes one or more records, an association of a tag (506) of a rich media object uploaded by the user (501) and an object ID (508) of the rich media object.

Rich media objects uploaded to a web server by a user may be tagged by the user with descriptions meaningful only to that user. Consider, for example, that a user uploads an image file of a pink elephant, but instead of tagging the image file with the text "blue elephant," the user tags the picture with the text "Gerald" because as the photographer of the image, the user has knowledge of the pink elephant's name. Such tags of objects made by the user that uploaded the object may provide inaccurate search results for other users. In this example, a user, other than the uploading user, in searching with the text "*Gerald's Game,*" a novel by Stephen King, may be returned a result of the image file of the pink elephant instead of search results associated with the novel.

The method of FIG. 5 also includes receiving (510), by the search engine (126) from the user (501), a search request (512). In the method of FIG. 5, the search request (512) includes as a search term one or more of the tags (514) recorded in the user's personal search index (504). The method of FIG. 5 also includes returning (516), by the search engine (126) in dependence upon the user's personal search index (504) and the primary search index (222), one or more search results (518), the search results (518) including one or more rich media objects, depicted in the method of FIG. 5 as object identifications (520).

The personal search index (504) may also be configured for use in embodiments in which the search engine is implemented as a component of a web environment and a user of the web environment is capable of specifying one or more rich media objects, uploaded by that user, as 'private' rich media objects, thereby denying access to the rich media objects to all other users. In such an embodiment, the search engine may maintain a personal search index for a user by specifying in the user's personal search index which objects tagged and uploaded by a user are private. Further, the search engine (126) in returning (516) one or more search results (516) for a particular requesting user (501), may be configured to return no results inaccessible by that particular requesting user (501), that is, no rich media objects specified as private by other users. Search results for a first user, in such an embodiment, will not include rich media objects specified as private by another user—objects which the first user is prohibited from accessing. Instead, the requesting user (501) will be returned one or more search results including rich media objects either private to the requesting user (501) or publicly accessible by all users (201).

Exemplary embodiments of the present invention are described largely in the context of a fully functional computer system for web search among rich media objects. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of web search by a search engine among rich media objects, the method comprising:
   maintaining, by a search engine for each of a plurality of users, a reputation score quantifying each user's activity of tagging rich media objects;
   counting a number of tags that include a particular searchable term, the particular searchable term among a plurality of searchable terms, the tags associated with a rich media object, the tag associations created by one or more of the plurality of users, the tags comprising text describing the rich media object, the text including the particular searchable term, the rich media object lacking a searchable textual element prior to the tag associations;
   calculating, by the search engine, a search result score for the particular searchable term included within tags of the rich media object, the search result score based on the number of tags associated with the rich media object that include the particular searchable term and the reputation scores of the users that associated the tags having the particular searchable term with the rich media object, the search result score specific to the particular searchable term, the rich media object having a distinct search result score for each of two or more searchable terms included in tags for the rich media object; and
   recording, by the search engine, in a primary search index, each search result score for each of the two or more searchable terms of the rich media object.

2. The method of claim 1 further comprising:
   receiving, by the search engine from a requesting user, a search request including the particular searchable term; and
   returning, by the search engine to the requesting user in dependence upon the primary search index, one or more search results including rich media objects, the search results ranked in order of calculated search result scores of the rich media objects.

3. The method of claim 1 wherein maintaining, by a search engine for each of a plurality of users, a reputation score further comprises:
   increasing the reputation score of a first user that previously associated a first tag with a particular rich media object upon subsequent associations, by other users, of matching tags with the particular rich media object.

4. The method of claim 1 wherein maintaining, by a search engine for each of a plurality of users, a reputation score further comprises:
   decreasing the reputation score of a user upon expiration of a predefined period of time during which the user associates no tags with rich media objects.

5. The method of claim 1 wherein maintaining, by a search engine for each of a plurality of users, a reputation score further comprises:
   identifying a malicious tag associated with a particular rich media object, the malicious tag including an inaccurate description of the particular rich media object intended to provide inaccurate search results for search requests having, as a search term, text included in the malicious tag; and
   decreasing the reputation score of users subsequently associating the same malicious tag to the particular rich media object.

6. The method of claim 1 further comprising:
   maintaining, by the search engine for at least one of the users, a personal search index in addition to the primary search index, including recording in the personal search index only tags associated by the at least one user with one or more rich media objects uploaded to a web server by the at least one user;
   receiving, by the search engine from the at least one user, a search request, the search request including as a search term one or more of the tags recorded in the user's personal search index; and
   returning, by the search engine in dependence upon the user's personal search index and the primary search index, one or more search results, the search results including one or more rich media objects.

7. Apparatus for web search among rich media objects, the apparatus comprising a computer processor, a computer memory operatively coupled to the computer processor, the computer memory having stored within it computer program instructions capable of:
   maintaining, by a search engine for each of a plurality of users, a reputation score quantifying each user's activity of tagging rich media objects;
   counting a number of tags that include a particular searchable term, the particular searchable term among a plurality of searchable terms, the tags associated with a rich media object, the tag associations created by one or more of the plurality of users, the tags comprising text describing the rich media object, the text including the particular searchable term, the rich media object lacking a searchable textual element prior to the tag associations;
   calculating, by the search engine, a search result score for the particular searchable term included within tags of the rich media object, the search result score based on the number of tags associated with the rich media object that include the particular searchable term and the reputation scores of the users that associated the tags having the particular searchable term with the rich media object, the search result score specific to the particular searchable term, the rich media object having a distinct search result score for each of two or more searchable terms included in tags for the rich media object; and
   recording, by the search engine, in a primary search index, each search result score for each of the two or more searchable terms of the rich media object.

8. The apparatus of claim 7 further comprising computer program instructions capable of:
   receiving, by the search engine from a requesting user, a search request including the particular searchable term; and
   returning, by the search engine to the requesting user in dependence upon the primary search index, one or more search results including rich media objects, the search results ranked in order of calculated search result scores of the rich media objects.

9. The apparatus of claim 7 wherein maintaining, by a search engine for each of a plurality of users, a reputation score further comprises:
  increasing the reputation score of a first user that previously associated a first tag with a particular rich media object upon subsequent associations, by other users, of matching tags with the particular rich media object.

10. The apparatus of claim 7 wherein maintaining, by a search engine for each of a plurality of users, a reputation score further comprises:
  decreasing the reputation score of a user upon expiration of a predefined period of time during which the user associates no tags with rich media objects.

11. The apparatus of claim 7 wherein maintaining, by a search engine for each of a plurality of users, a reputation score further comprises:
  identifying a malicious tag associated with a particular rich media object, the malicious tag including an inaccurate description of the particular rich media object intended to provide inaccurate search results for search requests having, as a search term, text included in the malicious tag; and
  decreasing the reputation score of users subsequently associating the same malicious tag to the particular rich media object.

12. The apparatus of claim 7 further comprising computer program instructions capable of:
  maintaining, by the search engine for at least one of the users, a personal search index in addition to the primary search index, including recording in the personal search index only tags associated by the at least one user with one or more rich media objects uploaded to a web server by the at least one user;
  receiving, by the search engine from the at least one user, a search request, the search request including as a search term one or more of the tags recorded in the user's personal search index; and
  returning, by the search engine in dependence upon the user's personal search index and the primary search index, one or more search results, the search results including one or more rich media objects.

13. A computer program product for web search among rich media objects, the computer program product being stored in a non-transitory computer readable storage medium, the computer program product comprising computer program instructions capable of:
  maintaining, by a search engine for each of a plurality of users, a reputation score quantifying each user's activity of tagging rich media objects;
  counting a number of tags that include a particular searchable term, the particular searchable term among a plurality of searchable terms, the tags associated with a rich media object, the tag associations created by one or more of the plurality of users, the tags comprising text describing the rich media object, the text including the particular searchable term, the rich media object lacking a searchable textual element prior to the tag associations;
  calculating, by the search engine, a search result score for the particular searchable term included within tags of the rich media object, the search result score based on the number of tags associated with the rich media object that include the particular searchable term and the reputation scores of the users that associated the tags having the particular searchable term with the rich media object, the search result score specific to the particular searchable term, the rich media object having a distinct search result score for each of two or more searchable terms included in tags for the rich media object; and
  recording, by the search engine, in a primary search index, each search result score for each of the two or more searchable terms of the rich media object.

14. The computer program product of claim 13 further comprising computer program instructions capable of:
  receiving, by the search engine from a requesting user, a search request including the particular searchable term; and
  returning, by the search engine to the requesting user in dependence upon the primary search index, one or more search results including rich media objects, the search results ranked in order of calculated search result scores of the rich media objects.

15. The computer program product of claim 13 wherein maintaining, by a search engine for each of a plurality of users, a reputation score further comprises:
  increasing the reputation score of a first user that previously associated a first tag with a particular rich media object upon subsequent associations, by other users, of matching tags with the particular rich media object.

16. The computer program product of claim 13 wherein maintaining, by a search engine for each of a plurality of users, a reputation score further comprises:
  decreasing the reputation score of a user upon expiration of a predefined period of time during which the user associates no tags with rich media objects.

17. The computer program product of claim 13 wherein maintaining, by a search engine for each of a plurality of users, a reputation score further comprises:
  identifying a malicious tag associated with a particular rich media object, the malicious tag including an inaccurate description of the particular rich media object intended to provide inaccurate search results for search requests having, as a search term, text included in the malicious tag; and
  decreasing the reputation score of users subsequently associating the same malicious tag to the particular rich media object.

18. The computer program product of claim 13 further comprising computer program instructions capable of:
  maintaining, by the search engine for at least one of the users, a personal search index in addition to the primary search index, including recording in the personal search index only tags associated by the at least one user with one or more rich media objects uploaded to a web server by the at least one user;
  receiving, by the search engine from the at least one user, a search request, the search request including as a search term one or more of the tags recorded in the user's personal search index; and
  returning, by the search engine in dependence upon the user's personal search index and the primary search index, one or more search results, the search results including one or more rich media objects.

* * * * *